US007983672B2

(12) United States Patent
Humblet et al.

(10) Patent No.: US 7,983,672 B2
(45) Date of Patent: Jul. 19, 2011

(54) MANAGING COMMUNICATIONS WITH PRIVATE ACCESS POINTS IN WIRELESS NETWORKS

(75) Inventors: Pierre A. Humblet, Cambridge, MA (US); Balaji Raghothaman, Hollis, NH (US)

(73) Assignee: Airvana, Corp., Chelmsford, MA (US)

(*) Notice: Subject to any disclaimer, the term of this patent is extended or adjusted under 35 U.S.C. 154(b) by 787 days.

(21) Appl. No.: 11/960,100

(22) Filed: Dec. 19, 2007

(65) Prior Publication Data

US 2009/0163202 A1 Jun. 25, 2009

(51) Int. Cl.
*H04W 4/00* (2009.01)

(52) U.S. Cl. ............... 455/432.1; 455/435.2; 455/552.1; 370/320; 370/331

(58) Field of Classification Search ............... 455/127.4, 455/418–420, 422.1, 432.1, 432.3, 435.1–435.3, 455/436, 440, 442, 445, 450, 466, 524, 525, 455/550.1, 551, 552.1, 553.1, 556.1, 558; 370/310, 312, 329–332, 338, 319–321, 324, 370/335, 350, 352
See application file for complete search history.

(56) References Cited

U.S. PATENT DOCUMENTS

| 6,711,144 | B1 | 3/2004 | Kim et al. |
| 6,731,618 | B1 | 5/2004 | Chung et al. |
| 6,741,862 | B2 | 5/2004 | Chung et al. |
| 6,781,999 | B2 | 8/2004 | Eyuboglu et al. |
| 7,170,871 | B2 | 1/2007 | Eyuboglu et al. |
| 7,194,264 | B2 * | 3/2007 | Li et al. ...................... 455/432.1 |
| 7,200,391 | B2 | 4/2007 | Chung et al. |
| 7,242,958 | B2 | 7/2007 | Chung et al. |
| 7,277,446 | B1 | 10/2007 | Abi-Nassif et al. |
| 7,292,852 | B2 * | 11/2007 | Uchida ...................... 455/432.1 |
| 7,299,278 | B2 | 11/2007 | Ch'ng |
| 7,542,451 | B2 * | 6/2009 | Cooper et al. ............... 370/335 |
| 7,558,356 | B2 | 7/2009 | Pollman et al. |
| 7,558,588 | B2 | 7/2009 | To et al. |

(Continued)

FOREIGN PATENT DOCUMENTS

GB 2452688 3/2009

OTHER PUBLICATIONS

3rd Generation Partnership Project 2 "3GPP2", "cdma2000 High Rate Packet Data Interface Specification", C.S0024, version 2, Oct. 27, 2000 (441 pages).

(Continued)

*Primary Examiner* — Anthony S Addy
(74) *Attorney, Agent, or Firm* — Fish & Richardson P.C.

(57) ABSTRACT

Communication is initiated with a radio access network through a first private access point according to a first air interface standard based on a first identifier corresponding to the first private access point. A second identifier corresponding to the first private access point is determined by using a roaming list. The second identifier is associated with the first identifier in the roaming list. A set of one or more carrier frequencies for communication according to a second air interface standard is determined using the roaming list. The second identifier is mapped to the set of one or more carrier frequencies in the roaming list. Based on the roaming list, initiation of communication with the radio access network is attempted through the first private access point according to the second air interface standard based on the second identifier at one carrier frequency of the set of one or more carrier frequencies.

30 Claims, 5 Drawing Sheets

```
Preferred Roaming List (PRL) ~400

System Table ~402                   ~408         ~410
    ID or Address ~406      Acq Index    Association Tag
    (SID/NID or Subnet)
    (geographical area 1) ~412 mSID/fNID1              100              a1 ~416
    mSID/fNID2              100 ~422         a2 ~418
    mSID/fNID3              100              a3 ~420
    ....
    fSubnet1                101              a1 ~416
    fSubnet2                101 ~424         a2 ~418
    fSubnet3                101              a3 ~420
    ....
    (geographical area N) ~414

Acquisition Table ~404
    Row      System Type ~428   Carrier Frequencies ~430
    ....

100 ~432   1x              x1, x2, x3 ~440
    101 ~434   DO              d1, d2, d3 ~442
    ....
```

U.S. PATENT DOCUMENTS

| Patent No. | Date | Inventor(s) | Class |
|---|---|---|---|
| 7,593,730 B2* | 9/2009 | Khandelwal et al. | 455/435.2 |
| 7,809,369 B2* | 10/2010 | Parmar et al. | 455/424 |
| 2002/0196749 A1 | 12/2002 | Eyuboglu et al. | |
| 2003/0100311 A1 | 5/2003 | Chung et al. | |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0148515 A1* | 7/2006 | Choi | 455/552.1 |
| 2006/0159045 A1 | 7/2006 | Ananthaiyer et al. | |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026859 A1* | 2/2007 | Hayashi | 455/432.1 |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0238476 A1 | 10/2007 | Raman et al. | |
| 2007/0242648 A1 | 10/2007 | Garg et al. | |
| 2007/0248042 A1 | 10/2007 | Harikumar et al. | |
| 2007/0281684 A1* | 12/2007 | Parmar et al. | 455/432.1 |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2008/0182615 A1* | 7/2008 | Xue et al. | 455/552.1 |
| 2008/0253550 A1 | 10/2008 | Ch'ng et al. | |
| 2008/0254792 A1 | 10/2008 | Ch'ng | |
| 2009/0034440 A1 | 2/2009 | Samar et al. | |
| 2009/0052395 A1* | 2/2009 | Bao et al. | 370/331 |
| 2009/0082020 A1 | 3/2009 | Ch'ng et al. | |
| 2009/0088155 A1 | 4/2009 | Kim | |
| 2009/0098872 A1* | 4/2009 | Deshpande et al. | 455/435.2 |
| 2009/0116445 A1 | 5/2009 | Samar et al. | |
| 2009/0154447 A1 | 6/2009 | Humblet | |
| 2009/0156165 A1 | 6/2009 | Raghothaman et al. | |
| 2009/0156195 A1 | 6/2009 | Humblet | |
| 2009/0156218 A1 | 6/2009 | Garg et al. | |
| 2009/0163202 A1 | 6/2009 | Humblet et al. | |
| 2009/0163216 A1 | 6/2009 | Hoang et al. | |
| 2009/0163238 A1 | 6/2009 | Rao et al. | |
| 2009/0164547 A1 | 6/2009 | Ch'ng et al. | |
| 2009/0168766 A1 | 7/2009 | Eyuboglu et al. | |
| 2009/0168788 A1 | 7/2009 | Den et al. | |
| 2009/0170440 A1 | 7/2009 | Eyuboglu et al. | |
| 2009/0170475 A1 | 7/2009 | Ch'ng et al. | |
| 2009/0170520 A1 | 7/2009 | Jones | |
| 2009/0170547 A1 | 7/2009 | Raghothaman et al. | |
| 2009/0172169 A1 | 7/2009 | CH'Ng et al. | |
| 2009/0172397 A1 | 7/2009 | Kim | |
| 2009/0186626 A1 | 7/2009 | Raghothaman et al. | |
| 2010/0085935 A1* | 4/2010 | Chin | 370/331 |
| 2010/0099412 A1* | 4/2010 | Ramachandran et al. | 455/435.2 |

OTHER PUBLICATIONS

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

* cited by examiner

FIG. 3

Preferred Roaming List (PRL) ~300

System Table ~302

| ID or Address ~306 (SID/NID or Subnet) | Acq Index ~308 | Association Tag ~310 |
|---|---|---|
| (geographical area 1) ~312 | | |
| mSID/fNID1 | 100 ~320 | a1 ~316 |
| mSID/NIDx | 130 ~322 | a5 ~318 |
| ..... | | |
| fSubnet1 | 101 ~324 | a1 ~316 |
| mSubnetx | 131 ~326 | a5 ~318 |
| ..... | | |
| (geographical area N) ~314 | | |
| ..... | | |

Acquisition Table ~304

| Row | System Type ~328 | Carrier Frequencies ~330 |
|---|---|---|
| ..... | | |
| 100 ~332 | 1x | x1, x2, x3 ~340 |
| 101 ~334 | DO | d1, d2, d3 ~342 |
| ..... | | |
| 130 ~336 | 1x | x1, x2 ~344 |
| 131 ~338 | DO | d1, d3 ~346 |
| ..... | | |

FIG. 4

Preferred Roaming List (PRL) ~400

System Table ~402

| ID or Address ~406 (SID/NID or Subnet) | Acq Index ~408 | Association Tag ~410 |
|---|---|---|
| (geographical area 1) ~412 | | |
| mSID/fNID1 | 100 ~422 | a1 ~416 |
| mSID/fNID2 | 100 | a2 ~418 |
| mSID/fNID3 | 100 | a3 ~420 |
| ... | | |
| fSubnet1 | 101 ~424 | a1 ~416 |
| fSubnet2 | 101 | a2 ~418 |
| fSubnet3 | 101 | a3 ~420 |
| ... | | |
| (geographical area N) ~414 | | |

Acquisition Table ~404

| Row | System Type ~428 | Carrier Frequencies ~430 |
|---|---|---|
| 100 ~432 | 1x | x1, x2, x3 ~440 |
| 101 ~434 | DO | d1, d2, d3 ~442 |
| ... | | |

FIG. 5

Preferred Roaming List (PRL) ~ 500

System Table ~ 502

| ID or Address ~ 506 (SID/NID or Subnet) | Acq Index ~ 508 | Association Tag ~ 510 |
|---|---|---|
| (geographical area 1) ~ 512 | | |
| mSID/fNID1 | 100 ~ 522 | a1 ~ 516 |
| mSID/fNID2 | 100 | a2 ~ 518 |
| mSID/fNID3 | 100 | a3 ~ 520 |
| | | |
| fSubnet1 | 101 ~ 524 | a1 ~ 516 |
| fSubnet2 | 102 ~ 526 | a2 ~ 518 |
| fSubnet3 | 103 ~ 528 | a3 ~ 520 |
| ... | | |
| (geographical area N) ~ 514 | | |

Acquisition Table ~ 504

| Row | System Type ~ 530 | Carrier Frequencies ~ 532 |
|---|---|---|
| 100 ~ 534 | 1x | x1, x2, x3 ~ 542 |
| 101 ~ 536 | DO | d1 ~ 544 |
| 102 ~ 538 | DO | d2 ~ 546 |
| 103 ~ 540 | DO | d3 ~ 548 |
| ... | | |

MANAGING COMMUNICATIONS WITH PRIVATE ACCESS POINTS IN WIRELESS NETWORKS

BACKGROUND

This disclosure relates to managing communications with private access points in wireless networks.

When connecting to a radio network, an access terminal selects an access point from available radio network access points that are found to be within communication range. Network protocols are used in communicating between an access point and an access terminal.

The 1xRTT protocol has been standardized by the Telecommunication Industry Association (TIA) in the TIA-2000.1 through TIA-2000.6 series of specifications, which are incorporated herein by reference.

The 1xEV-DO protocol has been standardized by the TIA as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-8560B, 3GPP2 C.S0024-B, version 1.0, May 2006, and is also incorporated herein by reference. Other wireless communication protocols may also be used.

SUMMARY

In general, in some aspects, a method includes initiating communication with a radio access network through a first private access point of a set of private access points. The communication is initiated according to a first air interface standard based on a first identifier corresponding to the first private access point. The method also includes determining a second identifier corresponding to the first private access point by using a roaming list identifying the set of private access points. The second identifier is associated with the first identifier in the roaming list. The method also includes determining, using the roaming list, a set of one or more carrier frequencies for communication according to a second air interface standard. The second identifier is mapped to the set of one or more carrier frequencies in the roaming list. The method also includes attempting, based on the roaming list, to initiate communication with the radio access network through the first private access point according to the second air interface standard based on the second identifier at one carrier frequency of the set of one or more carrier frequencies.

Implementations may include one or more of the following features.

In the method, a third identifier corresponding to a second private access point of the set of private access points identified by the roaming list may be associated with a fourth identifier in the roaming list. The fourth identifier may be mapped to a second set of one or more carrier frequencies in the roaming list. The second set of one or more carrier frequencies may be for communication according to the second air interface standard. The third identifier may be different from the first identifier. The second identifier may be different from the fourth identifier. The set of one or more carrier frequencies may consist of a first single carrier frequency and the second set of one or more carrier frequencies may consist of a second single carrier frequency that is different from the first single carrier frequency. The set of one or more carrier frequencies may include the second set of one or more carrier frequencies. The initiating may be carried out in response to receiving an indication that at least one private access point from the set of private access points identified in the roaming list is nearby. The method may further include receiving the roaming list from a programmable server associated with the radio access network.

In some aspects, a computer program product is tangibly embodied in one or more information carriers and includes instructions that are executable by one or more processing devices to initiate communication with a radio access network through a first private access point of a set of private access points. The communication is initiated according to a first air interface standard based on a first identifier corresponding to the first private access point. The computer program product also includes instructions that are executable by the one or more processing devices to determine a second identifier corresponding to the first private access point by using a roaming list identifying the set of private access points. The second identifier is associated with the first identifier in the roaming list. The computer program product also includes instructions that are executable by the one or more processing devices to determine, using the roaming list, a set of one or more carrier frequencies for communication according to a second air interface standard. The second identifier is mapped to the set of one or more carrier frequencies in the roaming list. The computer program product also includes instructions that are executable by the one or more processing devices to attempt, based on the roaming list, to initiate communication with the radio access network through the first private access point according to the second air interface standard based on the second identifier at one carrier frequency of the set of one or more carrier frequencies.

Implementations may include one or more of the following features.

In the computer program product, a third identifier corresponding to a second private access point of the set of private access points identified by the roaming list may be associated with a fourth identifier in the roaming list. The fourth identifier may be mapped to a second set of one or more carrier frequencies in the roaming list. The second set of one or more carrier frequencies may be for communication according to the second air interface standard. The third identifier may be different from the first identifier. The set of one or more carrier frequencies may consist of a first single carrier frequency and the second set of one or more carrier frequencies may consist of a second single carrier frequency that is different from the first single carrier frequency. The set of one or more carrier frequencies may include the second set of one or more carrier frequencies.

In some aspects, a system includes an access terminal. The access terminal includes memory configured to store instructions for execution, and one or more processing devices configured to execute the instructions. The instructions are for causing the one or more processing devices to initiate communication with a radio access network through a first private access point of a set of private access points. The communication is initiated according to a first air interface standard based on a first identifier corresponding to the first private access point. The instructions are also for causing the one or more processing devices to determine a second identifier corresponding to the first private access point by using a roaming list identifying the set of private access points. The second identifier is associated with the first identifier in the roaming list. The instructions are also for causing the one or more processing devices to determine, using the roaming list, a set of one or more carrier frequencies for communication according to a second air interface standard. The second identifier is mapped to the set of one or more carrier frequencies in the roaming list. The instructions are also for causing the one or more processing devices to attempt, based on the roaming list, to initiate communication with the radio access network through the first private access point according to the second air interface standard based on the second identifier at one carrier frequency of the set of one or more carrier frequencies.

Implementations may include one or more of the following features.

In the system, a third identifier corresponding to a second private access point of the set of private access points identified by the roaming list may be associated with a fourth identifier in the roaming list. The fourth identifier may be mapped to a second set of one or more carrier frequencies in the roaming list. The second set of one or more carrier frequencies may be for communication according to the second air interface standard. The third identifier may be different from the first identifier. The set of one or more carrier frequencies may consist of a first single carrier frequency and the second set of one or more carrier frequencies may consist of a second single carrier frequency that is different from the first single carrier frequency. The set of one or more carrier frequencies may include the second set of one or more carrier frequencies. The system may further include a programmable server configured to generate the roaming list and to provide the roaming list to the access terminal. The programmable server may be configured to generate an updated roaming list identifying an updated set of private access points and to provide the updated roaming list to the access terminal. The system may also include the first private access point of the set of private access points. The first private access point may be configured to be assigned the first identifier and the second identifier by the programmable server.

In general, in some aspects, a method includes consulting a roaming list identifying a set of private access points. The set of private access points is for communicating with a radio access network. The roaming list includes a first table and a second table. The first table includes a first identifier associated with a second identifier. The first and the second identifiers each correspond to a first private access point of the set of private access points. The first table also includes a third identifier associated with a fourth identifier. The third and the fourth identifiers each correspond to a second private access point of the set of private access points. The first and third identifiers are compatible with a first air interface standard and the second and fourth identifiers are compatible with a second air interface standard. The first identifier is different from the third identifier. The first table also includes a first index corresponding to a first row for the second identifier in the first table. The first index is directed to a second row in the second table. The second row includes a first set of one or more carrier frequencies. The first table also includes a second index corresponding to a third row for the fourth identifier in the first table. The second index is directed to a fourth row in the second table. The fourth row includes a second set of one or more carrier frequencies. The method also includes selecting, using the roaming list, a private access point of the set of private access points to use to communicate with the radio access network according to the first air interface standard and the second air interface standard.

Implementations may include one or more of the following features.

The method may further include, if the first private access point is selected, attempting communication with the first private access point according to the second air interface standard using one of the first set of one or more carrier frequencies. The method may further include, if the second private access point is selected, attempting communication with the second private access point according to the second air interface standard using one of the second set of one or more carrier frequencies. The second identifier may be different from the fourth identifier. The first set of one or more carrier frequencies may consist of a first single carrier frequency and the second set of one or more carrier frequencies may consist of a second single carrier frequency that is different from the first single carrier frequency. The first index may include the second index, the second row may include the fourth row, and the first set of one or more carrier frequencies may include the second set of one or more carrier frequencies. The first set of one or more carrier frequencies may consist of a single carrier frequency. The method may further include receiving the roaming list from a programmable server associated with the radio access network. The roaming list may be received via an over-the-air configuration protocol. The first table may include the second table. The first and the third identifiers may include System ID/Network IDs (SID/NIDs), and the second and the fourth identifiers may include Subnet IDs. The first air interface standard may be 1xRTT and the second air interface standard may be EV-DO.

In some aspects, a computer program product is tangibly embodied in one or more information carriers and includes instructions that are executable by one or more processing devices to consult a roaming list identifying a set of private access points. The set of private access points is for communicating with a radio access network. The roaming list includes a first table and a second table. The first table includes a first identifier associated with a second identifier. The first and the second identifiers each correspond to a first private access point of the set of private access points. The first table also includes a third identifier associated with a fourth identifier. The third and the fourth identifiers each correspond to a second private access point of the set of private access points. The first and third identifiers are compatible with a first air interface standard and the second and fourth identifiers are compatible with a second air interface standard. The first identifier is different from the third identifier. The first table also includes a first index corresponding to a first row for the second identifier in the first table. The first index is directed to a second row in the second table. The second row includes a first set of one or more carrier frequencies. The first table also includes a second index corresponding to a third row for the fourth identifier in the first table. The second index is directed to a fourth row in the second table. The fourth row includes a second set of one or more carrier frequencies. The computer program product also includes instructions that are executable by the one or more processing devices to select, using the roaming list, a private access point of the set of private access points to use to communicate with the radio access network according to the first air interface standard and the second air interface standard.

Implementations may include one or more of the following features.

The computer program product may further include instructions that are executable by the one or more processing devices to, if the first private access point is selected, then attempt communication with the first private access point according to the second air interface standard using one of the first set of one or more carrier frequencies. The second identifier may be different from the fourth identifier. The first set of one or more carrier frequencies may consist of a first single carrier frequency and the second set of one or more carrier frequencies may consist of a second single carrier frequency that is different from the first single carrier frequency. The first index may include the second index, the second row may include the fourth row, and the first set of one or more carrier frequencies may include the second set of one or more carrier frequencies. The computer program product may further include instructions that are executable by the one or more processing devices to receive the roaming list from a programmable server associated with the radio access network.

In some aspects, a system includes an access terminal. The access terminal includes memory configured to store instructions for execution, and one or more processing devices configured to execute the instructions. The instructions are for causing the one or more processing devices to consult a roaming list identifying a set of private access points. The set of private access points is for communicating with a radio access network. The roaming list includes a first table and a second table. The first table includes a first identifier associated with a second identifier. The first and the second identifiers each correspond to a first private access point of the set of private access points. The first table also includes a third identifier associated with a fourth identifier. The third and the fourth identifiers each correspond to a second private access point of the set of private access points. The first and third identifiers are compatible with a first air interface standard and the second and fourth identifiers are compatible with a second air interface standard. The first identifier is different from the third identifier. The first table also includes a first index corresponding to a first row for the second identifier in the first table. The first index is directed to a second row in the second table. The second row includes a first set of one or more carrier frequencies. The first table also includes a second index corresponding to a third row for the fourth identifier in the first table. The second index is directed to a fourth row in the second table. The fourth row includes a second set of one or more carrier frequencies. The instructions are for causing the one or more processing devices to select, using the roaming list, a private access point of the set of private access points to use to communicate with the radio access network according to the first air interface standard and the second air interface standard.

The system may further include instructions that are executable by the one or more processing devices to, if the first private access point is selected, then attempt communication with the first private access point according to the second air interface standard using one of the first set of one or more carrier frequencies. The second identifier may be different from the fourth identifier. The first set of one or more carrier frequencies may consist of a first single carrier frequency and the second set of one or more carrier frequencies may consist of a second single carrier frequency that is different from the first single carrier frequency. The first index may include the second index, the second row may include the fourth row, and the first set of one or more carrier frequencies may include the second set of one or more carrier frequencies. The system may further include a programmable server associated with the radio access network and configured to generate the roaming list and to provide the roaming list to the access terminal. The programmable server may be configured to generate an updated roaming list identifying an updated set of private access points and to provide the updated roaming list to the access terminal.

In some aspects, a method includes generating a roaming list identifying a set of private access points for an access terminal. The set of private access points is for communicating with a radio access network. The roaming list includes a first table and a second table. The method also includes associating a first identifier with a second identifier in the first table. The first and the second identifiers each correspond to a first private access point of the set of private access points. The method also includes associating a third identifier with a fourth identifier in the first table. The third and the fourth identifiers each correspond to a second private access point of the set of private access points. The first and third identifiers are compatible with a first air interface standard and the second and fourth identifiers are compatible with a second air interface standard. The method also includes providing a first index corresponding to a first row for the second identifier in the first table. The first index is directed to a second row in the second table. The second row includes a first set of one or more carrier frequencies for the access terminal to use to attempt communication with the first private access point according to the second air interface standard. The method also includes providing a second index corresponding to a third row for the fourth identifier in the first table. The second index is directed to a fourth row in the second table. The fourth row includes a second set of one or more carrier frequencies for the access terminal to use to attempt communication with the second private access point according to the second air interface standard. The method also includes providing the roaming list to the access terminal. The method may also include generating an updated roaming list identifying an updated set of private access points, and providing the updated roaming list to the access terminal. In some aspects, a computer program product is tangibly embodied in one or more information carriers and includes instructions that are executable by one or more processing devices to generate a roaming list identifying a set of private access points for an access terminal. The set of private access points is for communicating with a radio access network. The roaming list includes a first table and a second table. The computer program product also includes instructions that are executable by the one or more processing devices to associate a first identifier with a second identifier in the first table. The first and the second identifiers each correspond to a first private access point of the set of private access points. The computer program product also includes instructions that are executable by the one or more processing devices to associate a third identifier with a fourth identifier in the first table. The third and the fourth identifiers each correspond to a second private access point of the set of private access points. The first and third identifiers are compatible with a first air interface standard and the second and fourth identifiers are compatible with a second air interface standard. The computer program product also includes instructions that are executable by the one or more processing devices to provide a first index corresponding to a first row for the second identifier in the first table. The first index is directed to a second row in the second table. The second row includes a first set of one or more carrier frequencies for the access terminal to use to attempt communication with the first private access point according to the second air interface standard. The computer program product also includes instructions that are executable by the one or more processing devices to provide a second index corresponding to a third row for the fourth identifier in the first table. The second index is directed to a fourth row in the second table. The fourth row includes a second set of one or more carrier frequencies for the access terminal to use to attempt communication with the second private access point according to the second air interface standard. The computer program product also includes instructions that are executable by the one or more processing devices to provide the roaming list to the access terminal. The computer program product may also include instructions that are executable by the one or more processing devices to generate an updated roaming list identifying an updated set of private access points, and provide the updated roaming list to the access terminal.

In some aspects, a system includes a programmable server associated with a radio access network and configured to provide a roaming list identifying a set of private access points to an access terminal. The programmable server includes memory configured to store instructions for execution, and one or more processing devices configured to execute the instructions. The instructions are for causing the one or more processing devices to generate the roaming list for the access terminal. The set of private access points is for communicating with the radio access network. The roaming list includes a first table and a second table. The instructions are also for causing the one or more processing devices to associate a first identifier with a second identifier in the first table. The first and the second identifiers each correspond to a first private access point of the set of private access points. The instructions are also for causing the one or more processing devices to associate a third identifier with a fourth identifier in the first table. The third and the fourth identifiers each correspond to a second private access point of the set of private access points. The first and third identifiers are compatible with a first air interface standard and the second and fourth identifiers are compatible with a second air interface standard. The instructions are also for causing the one or more processing devices to provide a first index corresponding to a first row for the second identifier in the first table. The first index is directed to a second row in the second table. The second row includes a first set of one or more carrier frequencies for the access terminal to use to attempt communication with the first private access point according to the second air interface standard. The instructions are also for causing the one or more processing devices to provide a second index corresponding to a third row for the fourth identifier in the first table. The second index is directed to a fourth row in the second table. The fourth row includes a second set of one or more carrier frequencies for the access terminal to use to attempt communication with the second private access point according to the second air interface standard. The instructions are also for causing the one or more processing devices to provide the roaming list to the access terminal. The system may also include instructions that are executable by the one or more processing devices to generate an updated roaming list identifying an updated set of private access points; and provide the updated roaming list to the access terminal.

The foregoing methods may be implemented as a computer program product comprised of instructions that are stored on one or more machine-readable media, and that are executable on one or more processing devices. The foregoing method may be implemented as an apparatus or system that includes one or more processing devices and memory to store executable instructions to implement the method. A graphical user interface may be generated that is configured to provide a user with access to and at least some control over stored executable instructions to implement the methods.

The details of one or more examples are set forth in the accompanying drawings and the description below. Further features, aspects, and advantages are apparent in the description, the drawings, and the claims.

DESCRIPTION OF THE DRAWINGS

FIGS. 3-5 show preferred roaming lists.

DETAILED DESCRIPTION

Figure 1:
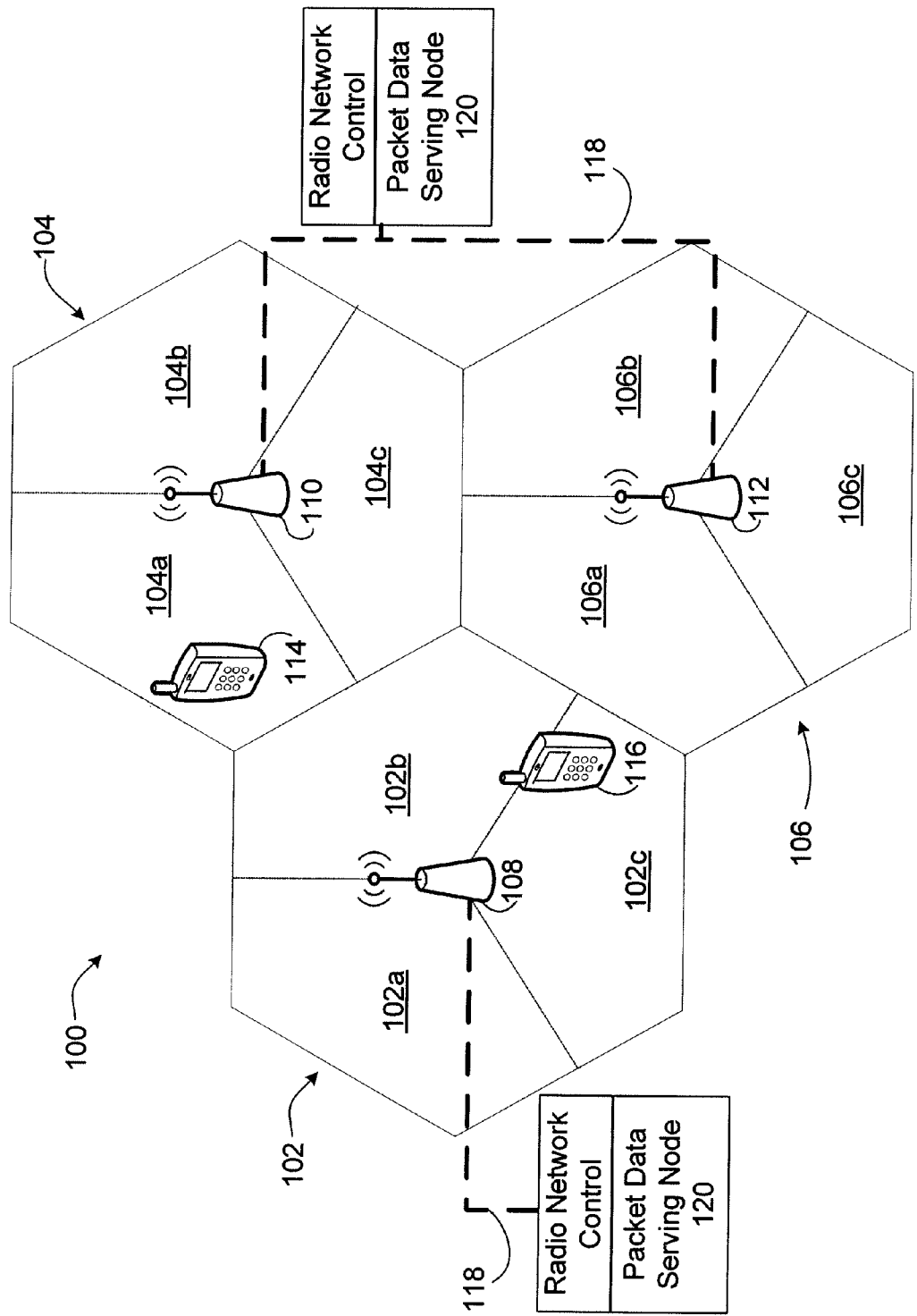
FIG. 1 shows a wireless network.

Cellular wireless communications systems are designed to serve many access terminals distributed in a large geographic area by dividing the area into cells, as shown in FIG. 1. At or near the center of each cell 102, 104, 106, a radio network access point 108, 110, 112, also referred to as a base transceiver station (BTS), is located to serve access terminals 114, 116 (e.g., cellular telephones, laptops, PDAs, also known as mobile stations) located in the cell. Each cell is often further divided into sectors 102*a-c*, 104*a-c*, 106*a-c* by using multiple sectorized antennas. In each cell, that cell's radio network access point may serve one or more sectors and may communicate with multiple access terminals in its cell.

The radio access network (RAN) 100 shown in FIG. 1 uses both a 1xRTT protocol and an EV-DO protocol to transmit voice and data packets between an access terminal, e.g., access terminals 114, 116, and a radio network access point, e.g., access points 108, 110, 112. In the example of FIG. 1, the access points 108, 110, 112 are connected over a backhaul connection 118 to radio network control/packet data serving nodes (RNC/PDSN) 120, which may be one or more physical devices at different locations. Although this description uses terminology from the 1xRTT and EV-DO air interface standards in CDMA (Code Division Multiple Access) networks, the same concepts are applicable to other communication methods.

Figure 2:
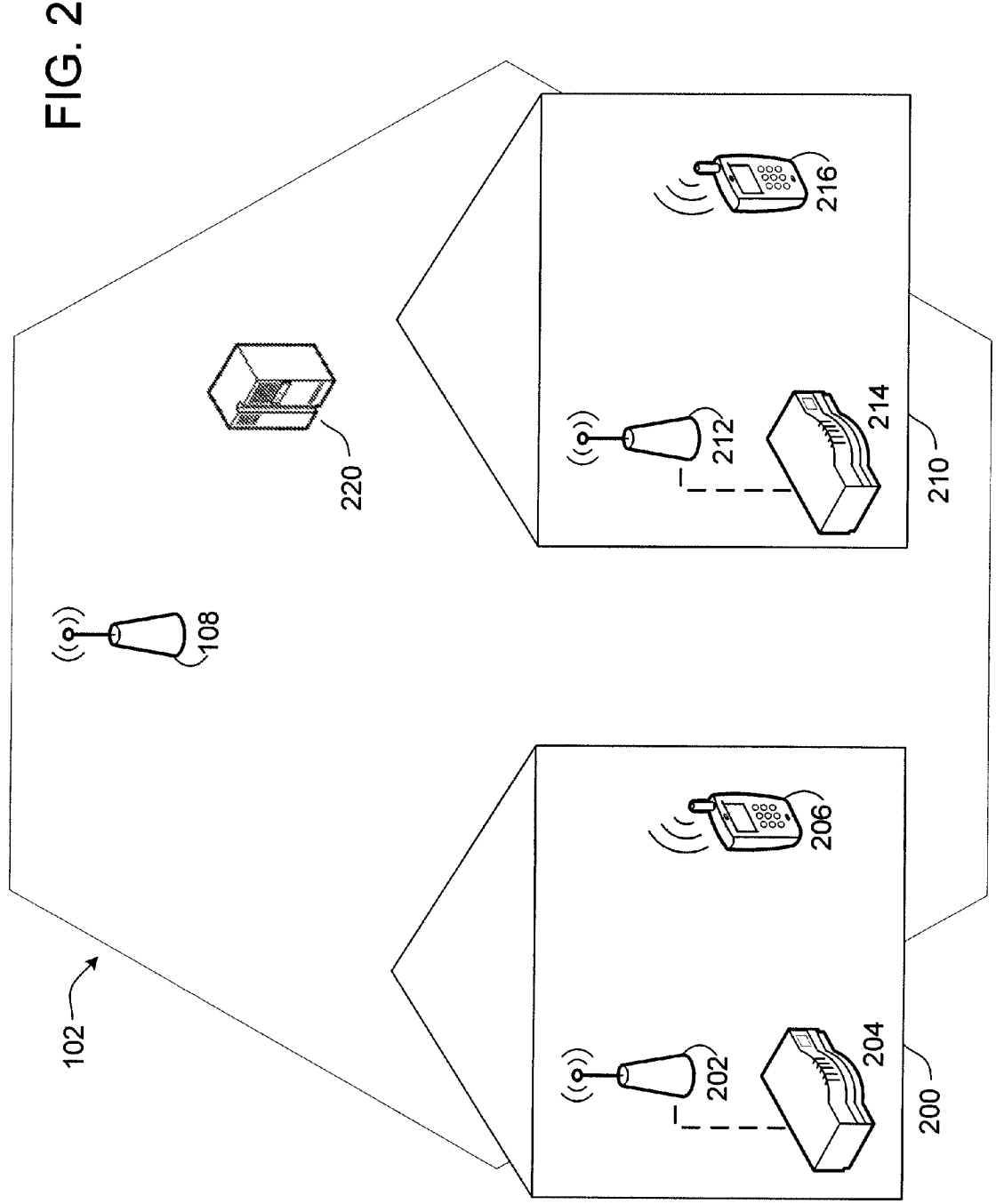
FIG. 2 shows a wireless network with a home networking deployment.

In some examples, as shown in FIG. 2, a radio network access point 202 may be deployed in a user's home 200 in a similar manner as a WiFi® access point. Such a radio network access point is referred to as a private access point. The private access point 202 may use an available high-speed internet connection, such as a DSL or cable modem 204, as the backhaul with the RNC/PDSN functionality implemented in the private access point 202. Such a private access point may be installed anywhere, for example, in an office, a public space, or a restaurant. When this description refers to a private access point being in a "home," that encompasses any such location. Private access points may include, for example, femtocells or picocells. In some examples, a private access point may be integrated into a cable modem or other network hardware, such as a router or WiFi access point.

When an authorized access terminal 206 is present inside the home (or anywhere within range of the private access point 202), it may use the private access point 202 rather than a regular cellular radio network access point, such as access point 108, to place or receive voice calls and data connections, even if the access terminal is otherwise within the cell 102 for that access point 108. We sometimes refer to the standard access point 108 as a macro access point or macro BTS to distinguish it from a private access point, as the standard access point 108 provides direct access to the wider RAN.

A neighboring home 210 may have its own private access point 212 connected to its cable modem 214 for use by its owner's access terminal 216. Neighboring private access points may operate independently, in part because real-time communications is difficult between neighboring private access points. Private access points may also operate in a licensed spectrum. Some details and examples of the operation of private access points are discussed in co-pending application Ser. No. 11/640,501, titled Provisioning Private Access Points for Wireless Networking, filed Dec. 15, 2006 and incorporated here by reference, Ser. No. 11/640,503, titled Configuring Preferred User Zone Lists for Private Access Points for Wireless Networking, filed Dec. 15, 2006 and incorporated here by reference, and Ser. No. 11/735,073, titled Controlling Access to Private Access Points for Wireless Networking, filed Apr. 13, 2007 and incorporated here by reference.

Access lists of authorized access terminals for each private access point can be manually configured on a central programmable server 220 and distributed to private access points, such as private access points 202, 212. Likewise, the programmable server 220 may be configured to generate access location lists such as preferred roaming lists (PRLs) that may contain information to locate, identify, and access sets of private access points and other access points and to distribute the lists to access terminals using an over-the-air parameter administration (OTAPA) or over-the-air provisioning (OTAP) system. The server 220 may periodically generate updated lists and provide the updated lists to access terminals. Access terminals may also retrieve access information from the programmable configuration server 220 themselves (in response to user input or autonomously).

Access terminals such as access terminals 206, 216 of FIG. 2 may store an access location list such as a PRL. A PRL may list identifiers or addresses of access points with which an access terminal may communicate. An access terminal may select an access point using the list for communication according to the 1xRTT air interface standard, the EV-DO air interface standard, or both. A simplified example of a PRL 300 is shown in FIG. 3. Actual PRLs may include other information than shown in FIG. 3. In the example shown in FIG. 3, the PRL 300 is divided into two tables, a System Table 302 and an Acquisition Table 304.

The Acquisition Table 304 is a rectangular table that includes rows and columns. The number of rows in the Acquisition Table 304 may vary while the number of columns may be fixed. The Acquisition Table 304 includes two columns: a System Type column 328 and a Carrier Frequencies column 330. By way of example, row indices 332, 334, 336, 338 identify particular Acquisition Table 304 rows, with each row index corresponding to either the 1xRTT ("1x") or the EV-DO ("DO") air interface standard. The System Type column 328 identifies the air interface standard, such as 1x or DO, applying to a given row. The Carrier Frequencies column 330 lists, for every table row identified by a row index, a corresponding set of carrier frequencies which the access terminal may use for communication with an access point. The row index "100" 332 identifies a particular row in the Acquisition Table 304 that corresponds to the 1xRTT ("1x") air interface standard and that includes a set 340 of carrier frequencies x1, x2, and x3 that an access terminal storing the PRL 300 may use for communication with an access point according to the 1x standard. Similarly, the row index "101" 334 identifies a particular row in the Acquisition Table 304 that corresponds to the EV-DO ("DO") air interface standard and that includes a set 342 of carrier frequencies d1, d2, and d3 that an access terminal storing the PRL 300 may use for communication with an access point according to the DO standard.

The System Table 302 of the PRL 300 includes rows and columns, and the number of rows may vary while the number of columns may be fixed. The System Table 302 includes three columns: an ID (Identifier) or Address column 306, an Acq (Acquisition) Index column 308, and an Association Tag column 310. The rows of the System Table 302 are also separated into N geographical areas 312 . . . 314. The ID or Address column 306 of the Table 302 lists addresses corresponding to and identifying various access points within each particular geographical area 312 . . . 314. The addresses may include System ID/Network ID (SID/NID) address pairs that are compatible with, and configured for, communication via the 1xRTT air interface standard ("1x standard") and Subnet addresses that are compatible with, and configured for, communication via the EV-DO air interface standard ("DO standard"). There may be and generally are numerous unique SID/NIDs and Subnets within a particular geographical area 312 . . . 314. The System Table 302 may use specific SID/NIDs in its table rows, or may list SID/NIDs that incorporate wildcards, such as SID/* (not shown in FIG. 3) that include all SID/NID addresses that share the same System ID.

The Association Tag column 310 of the System Table 302 lists association tags that correspond to one or more other rows in the System Table 302. The association tags such as tags 316, 318 associate identifiers in the System Table 302 with one another. The association tag "a1" 316 associates the identifier "mSID/N1" with the identifier "fSubnet1," and the tag "a5" 318 associates the identifier "mSID/NIDx" with the identifier "mSubnetx," for example.

The Acquisition Index column 308 of the System Table 302 lists acquisition indices that correspond to identifiers in the System Table 302. The acquisition indices such as indices 320, 322, 324, 326 are directed to, and provide links to, corresponding rows in the Acquisition Table 304. The acquisition index "100" 320, corresponding to the identifier "mSID/fNID1" that is compatible with the 1x standard, is directed to the Acquisition Table 304 row identified by the row index "100" 332. Similarly, the acquisition index "101" 324, corresponding to the identifier "fSubnet1" that is compatible with the DO standard, is directed to the Acquisition Table 304 row identified by the row index "101" 334.

Priorities may be assigned to rows within the System Table 302. In an implementation, a table row (along with its corresponding identifier) that is higher in the System Table 302 than another table row, within a particular geographical area such as areas 1 to N 312 . . . 314, may generally be assigned a higher or equal priority for communication than the other table row, relative to the particular standard (1x or DO) for communication. That is, by virtue of its location in the System Table 302, the table row and its corresponding identifier "mSID/fNID1" are at a higher (or at least equal) priority for 1x standard communication than the table row and its corresponding identifier "mSID/NIDx." Similarly, the System Table 302 row and corresponding identifier "fsubnet1" are at a higher (or at least equal) priority for DO standard communication than the table row and its corresponding identifier "mSubnetx." In other implementations, other orders of priority, table listings, and table arrangements are possible.

In an implementation, the Acquisition Table 304 rows and corresponding identifying row indices may be listed in descending order of acquisition priority. That is, the lower the row index, the higher the priority for (1x or DO standard) communication. The Acquisition Table 304 row identified by row index "100" 332 is at a higher priority for 1x standard communication than the row identified by row index "130" 336. Similarly, the Acquisition Table 304 row identified by row index "101" 334 is at a higher priority for DO standard acquisition than the row identified by row index "131" 338. In other implementations, other orders of priority, table listings, and table arrangements are possible.

Access terminals, such as the access terminal 206 shown in FIG. 2, that communicate via the 1xRTT and EV-DO air interface standards generally include a radio transmitter and receiver for parallel communication via these standards: the access terminal 206 may alternate between transmitting voice packets according to the 1xRTT protocol and transmitting data packets according to the EV-DO protocol, for example.

In an implementation, the access terminal 206 includes two basic procedures for communication via the 1x and DO standards, startup and "rove-in". Startup refers to a process by which the access terminal 206 may boot up and search for an access point to communicate with, ultimately acquiring, for example, respective 1x and DO voice and data connections with the private access point 202. Rove-in refers to a process by which the access terminal 206 may acquire respective 1x and DO voice and data connections between its 1x and DO radio transmitter/receiver and the private access point 202 by switching communication from, for example, the macro access point 108 or another private access point such as private access point 212.

For the startup process, an access terminal 206 that boots up at the user's home 200 will first consult the PRL 300 at the Acquisition Table 304. The access terminal will attempt to acquire a channel by listening to the sets of carrier frequencies for 1x communications listed in the rows of the Acquisition Table 304. The access terminal will begin with the highest priority rows of the Acquisition Table 304. When the access terminal 206 hears a broadcast message with a SID/NID from an access point on one of the selected frequencies for 1x communications, the terminal 206 consults the PRL 300 at the System Table 302 row corresponding to the received SID/ND. The access terminal 206 then examines the list of SID/NIDs in the ID or Address column 306 to see if there are any SID/NID identifiers that are higher in priority than the received SID/ND. If higher priority SID/NID identifiers are in the System Table 302, the access terminal 206 examines the acquisition index in the Acq (Acquisition) Index column 308 corresponding to the higher priority SID/ND identifier and is directed to the appropriate table row in the Acquisition Table 304 by the acquisition index. Once in the appropriate table row, the access terminal attempts to acquire a channel by listening to the set of carrier frequencies, one by one, in order, for 1x communication corresponding to that table row. If no higher priority SID/NID identifiers are in the System Table 302, the access terminal 206, initiates communication with the access point entity that sent the broadcast message.

The "rove-in" process may differ somewhat from the startup process, and may include several scenarios. In a first scenario, the access terminal 206 of FIG. 2 may detect a stronger 1x signal coming from the private access point 202 than from either the macro access point 108 or the private access point 212.

In a second scenario, the access terminal 206 may also begin the "rove-in" process by detecting a 1x beacon signal from the private access point 202 on the same frequency that the access terminal is communicating with the macro access point 108 or the private access point. The private access point 202 may transmit the beacon signal in order to instruct the access terminal 206 to look for a 1x standard signal on the frequency at which the private access point 202 supports 1x standard transmissions. Once the access terminal 206 is directed to the other frequency and can detect the stronger 1x signal, the rove-in process proceeds as in the first scenario.

Regardless of the way in which the "rove-in" process may begin, the access terminal 206 eventually detects a 1x signal with a particular SID/NID coming from the private access point 202. In the case of the private access point 202, the access terminal 206 may eventually send a registration message to the private access point 202 and begin communication via the 1x standard.

For communication via the EV-DO protocol, the startup process and rove-in process, absent other constraints, may each proceed in a manner parallel to that seen for communication the 1x protocol. For example, a private access point 202, absent other constraints, would be configured to provide a dedicated beacon signal for the DO standard (to instruct the access terminal 206 to look for a DO standard signal on the frequency at which the private access point 202 supports DO standard transmissions). Such a configuration provides added cost for the private access point 202.

Many access terminals have been designed to determine and establish a voice connection with an access point via the 1xRTT protocol before determining and establishing a parallel data connection with the access point via the EV-DO protocol. Providers of wireless services such as Sprint or Verizon have traditionally preferred that access terminals use the same provider's access points (but not necessarily the same access point) for 1x and DO communication. With the advent of private wireless networks it is advantageous for an access terminal to maintain a data connection via the EV-DO protocol with the same access point that the access terminal maintains a voice connection with via the 1xRTT protocol, so that if an access terminal switches 1xRTT protocol communication from one access point to another, then the access terminal should make a corresponding switch on the EV-DO protocol communication side. These factors and constraints may affect both how an access list, such as a preferred roaming list (PRL) for an access terminal, is structured and how the access terminal is configured to use the access list.

To align communications on the 1x standard side of the access terminal 206 with communications on the DO standard side, all private access points within a given set of private access points, such as private access points 202, 212, may be assigned a single SID/NID identifier (for 1x communications) as well as a single accompanying Subnet identifier (for DO communications) that is associated with the SID/NID identifier in a PRL. This alignment alleviates any requirement that a private access point include a dedicated DO beacon signal, since the access terminal already would know, given the association between the SID/NID identifier and the Subnet identifier in the PRL, to attempt to initiate communication with a private access point for DO communications instead of staying on the macro network. The single SID/NID identifier may include a unique SID (e.g., not shared with any macro access point) and a (possibly) non-unique NID, or a (possibly) non-unique SID and a unique NID (e.g., not shared with any macro access point).

In particular, in the PRL 300 of FIG. 3, a set of private access points within the geographical area 1 312 have been assigned the SID/NID identifier "mSID/NID1." The System ID "mSID" is the same as the System ID for the macro access point within the area 312 and in range of the set of private access points. In another implementation, the System ID may be different from the System ID of any macro access point. The Network ID "fNID1" (different from the Network ID of any macro access point) is assigned to the set of private access points, so that the private access points share a single identifier "mSID/fNID1" that differs from the SID/NID of the macro access point, "mSID/NIDx." Similarly, the set of private access points have been assigned the Subnet identifier "fsubnet1" that differs from the Subnet identifier of the macro access point, "mSubnetx." Both the SID/NID and the Subnet of the set of private access points have been assigned a higher priority in the System Table 302 than the SID/NID and the Subnet of the macro access point. In an implementation, the SID/ND and Subnet of the private access points are assigned the same priority as the SID/NID and the Subnet of the macro access point so that the access terminal will not continue to search for a higher priority system (e.g., one of the set of private access points) when communicating with the macro access point, which may preserve the battery life of the access terminal.

Operation of the access terminal 206 of FIG. 2 may be explained with reference to the PRL 300 of FIG. 3. For rove-in, the access terminal 206 is initially communicating with, for example, the macro access point 108 according to the 1x protocol at a frequency x2, with identifier "mSID/NIDx," and according to the DO protocol at frequency d2, with identifier "mSubnetx." The access terminal 206 comes within range of the private access point 202, possibly by a user of the terminal entering her home 200. If the private access point 202 uses a different frequency than the macro 108 for 1x communications, such as frequency x1, the private access point 202 may be configured to send a beacon signal at frequency x2 to instruct the access terminal 206 to listen for a signal on frequency x1. If the private access point 202 uses the same frequency as the macro 108 for 1x communications, that is, the frequency x2, then the stronger signal of the private access point 202 heard by the access terminal 206 (given the proximity of the terminal 206 to the private access point 202 rather than to the macro 108) will cause the rove-in process to begin. The access terminal 206 sees the SID/NID of the private access point 202, "mSID/fNID1" and sends a registration message to the private access point 202, and initiates communication with the private access point 202 according to the 1x protocol.

For DO communications, the access terminal 206 consults the PRL 300 by examining the System Table 302 row that begins with the SID/NID of the private access point 202, "mSID/fNID1." This returns an acquisition index for 1x, "100" 320, but this provides no additional information since the access terminal is already using the 1x frequency x2. Also returned is the association tag "a1" 316, which associates the 1x identifier "mSID/fNID1" with the DO identifier "fSubnet1." The DO identifier "fsubnet1" does not match the DO identifier "mSubnetx" currently in use with the macro access point 108. The access terminal 206 will thus look for another DO access point. Consultation of the table row for "fsubnet1" returns an acquisition index for DO, "101" 324, which is directed to and links into the Acquisition Table 304 at row index "101" 334. Row index "101" 334 identifies a set 342 of carrier frequencies for DO, d1, d2, and d3 and instructs the access terminal 206 to listen for a transmission at these frequencies. The access terminal 206 listens for a DO transmission at carrier frequency d1, then at d2, and then at d3, stopping when it hears a DO transmission. If the private access point 202 is sending DO transmissions at frequency d1 at a signal strength for the access terminal 206 to detect them, then the access terminal 206 will initiate communication with the private access point 202 according to the DO protocol.

Assigning all private access points within a given set of private access points a single SID/NID identifier (for 1x communications) as well as a single accompanying Subnet identifier (for DO communications) that is associated with the SID/NID identifier in a PRL (such as in PRL 300), although generally advantageous, can present several challenges when an access terminal is within range of adjacent private access points that share these identifiers.

Private access points may be placed adjacent or close to one another, or located in the same place or general area. As shown in FIG. 2, the private access point 202 and the private access point 212 may be adjacent to one another, even though the access points 202, 212 are located in different homes 200, 216. The access terminal 206 may not be authorized (by, for example, the server 220 or the private access point 212) to communicate with the private access point 212, located in the neighboring home 210.

If the private access points 202, 212 share the same SID/ND and Subnet, for example, "mSID/fNID1" and "fSub- net1," and happen to transmit at the same carrier frequency (say frequency d3) for DO protocol communication, then the possibility for a "timeout" on DO communication arises. As the access terminal 206 "roves-in" from the macro access point 108, the access terminal 206 may communicate according to the 1x protocol with the private access point 202 on a frequency x1. The private access point 212, even if using the same frequency for 1x protocol communications as the private access point 202, will normally not be strong enough to interfere. If radio propagation in the area of private access points 202, 212 is such that the signal strength of the DO frequency from the private access point 202 is weak or unavailable from the perspective of the access terminal 206, the access terminal will use the association tag "a1" 316 corresponding to the identifier "mSID/fNID1" (shared by the private access points 202, 212) to find the associated Subnet, "fSubnet1." The access terminal 206 uses the corresponding acquisition index "101" 324 to link into the Acquisition Table 304 at the table row identified by row index "101" 334 with the corresponding set 342 of frequencies d1, d2, and d3. Since "fSubnet1" is not unique and is used by both private access points 202, 212, the access terminal will listen for DO protocol messages on successive frequencies d1, d2, and d3 and will detect the first message it hears from either private access point 202, 212.

As described above, the private access points 202, 212 happen to be using the same carrier frequency d3 for DO protocol communications. Thus, the access terminal 206 will (here unsuccessfully) attempt to acquire a channel at d1 and d2. Eventually, the access terminal 206 listens on frequency d3, and hears the stronger signal (stronger due to radio propagation at the d3 frequency in the particular area of the access terminal 206) from the private access point 212 rather than the weaker signal from the private access point 202. Since communicating with the private access point 212 is not prohibited by the PRL 300 due to the shared SID/NID and Subnet of the private access points 202, 212, the access terminal can send a registration message to the private access point 212. The private access point 212 will reject the registration message from the unauthorized access terminal 206 and the access terminal will experience a timeout for DO protocol communications, typically for 10 minutes or the like, preventing the access terminal from using the frequency d3 for communications.

Thus, even if the radio propagation should change for DO protocol communications with the private access point 202 (for example, by the access terminal 206 moving closer to the private access point 202), the access terminal 206 will be unable to make a data connection using the DO protocol for the length of the timeout period. A user of the access terminal 206 would be without high speed DO data communication such as Internet for the duration of the timeout period. That is, the access terminal 206 may use the typically slower 1x system to access the Internet.

Another challenge posed by adjacent private access points generally is that grouping several private access points under the same Subnet identifier, such as "fsubnet1" in PRL 300 of FIG. 3, means that a set, possibly a large set, of carrier frequencies is mapped to that single Subnet identifier. That is, in PRL 300 the "fsubnet1" identifier is mapped to the set 342 of carrier frequencies d1, d2, and d3 by the corresponding acquisition index "101" 324 in the "fsubnet1" table row in the System Table 302 and the row index "101" 334 that identifies the table row in the Acquisition Table 304. The set of carrier frequencies mapped to the single Subnet identifier must be searched by an access terminal to acquire a frequency channel for DO protocol communications. Depending on the number of frequencies in the set, and which frequencies are being used by private access point within the range of the access terminal, searching the frequencies by the access terminal may result in slow acquisition by the access terminal and may also result in battery loss on the access terminal.

Several modifications to private access point addressing may be made to respond to the challenges posed by adjacent private access points that share the same SID/NID and Subnet identifiers. One potential modification is to assign different NIDs (and thus different SID/NIDs) and different Subnet identifiers to adjacent private access points, such as private access points 202, 212. Another potential modification is to have adjacent private access points, such as private access points 202, 212, use different carrier frequencies for DO protocol communications. In an implementation, private access point 202 may use carrier frequency d1, while private access point 212 may use carrier frequency d2.

Example implementations that include one or more of these modifications are illustrated in FIGS. 4 and 5. FIG. 4 shows a PRL 400 including a System Table 402 and an Acquisition Table 404. In the PRL 400, adjacent private access points are assigned separate SID/NID identifiers and separate Subnet identifiers as shown in the ID or Address column 406 of the System Table 402. A first private access point such as private access point 202 has a SID/NID "mSID/fNID1" with a unique NID "fNID1." An association tag "a1" 416 from the Association Tag column 410 associates the mSID/fNID1 identifier with a unique Subnet, "fsubnet1." A second private access point such as private access point 212 has a SID/NID "mSID/fNID2" associated with a Subnet "fSubnet2" by an association tag "a2" 418. A third private access point (not shown in FIG. 2) has a SID/NID "mSID/fNID3" associated with a Subnet "fSubnet3" by an association tag "a3" 420. The three SID/NID identifiers (compatible with the 1x protocol) have a corresponding single acquisition index "100" 422 that is directed to and links to a row in the Acquisition Table 404 that is identified by a row index "100" 432 and that includes a set 440 of three carrier frequencies x1, x2, and x3 for 1x protocol communication. The three Subnet identifiers (compatible with the DO protocol) likewise have a corresponding single acquisition index "101" 424 that is directed to and links to a row in the Acquisition Table 404 that is identified by a row index "101" 434 and that includes a set 442 of three carrier frequencies d1, d2, and d3 for DO protocol communication.

Assigning different NIDs (and thus different SID/NIDs) and, particularly, different Subnet identifiers to adjacent private access points, such as private access points 202, 212, as shown in FIG. 4, avoids a timeout period due to an access terminal 206 being rejected as unauthorized for DO protocol communication by a private access point in instances where adjacent private access points use the same frequency for DO protocol communications. According to this implementation, an access terminal 206 will not attempt to register or initiate DO protocol communications with the private access point 212 for which it is not authorized. If the access terminal 206 hears a Subnet in a DO protocol message from the private access point 212 other than the private access point 202 that the access terminal 206 is using to communicate with the RAN via the 1x protocol, the access terminal 206 will know from consulting the PRL 400 that that Subnet is not associated with the SID/NID of the private access point 202 that the access terminal is using for the 1x protocol, and thus will not attempt to initiate communication with the private access point 212 according to the DO protocol. Since the access terminal 206 (unauthorized on private access point 212) does not attempt to register or to communicate with the private access point 212 for DO communications, the access terminal 206 will not be rejected and thus will face no timeout period. Thus, when the radio propagation is good for communications with the private access point 202 via the DO protocol (that may be, for example, when the access terminal 206 moves closer to the private access point 202), the access terminal 206 can initiate communications more immediately since no timeout period applies.

In the implementation shown in the PRL 400 of FIG. 4, an access terminal already communicating with a private access point having a SID/NID identifier "mSID/fNID1" and an associated Subnet identifier "fSubnet1" will search the set 442 of carrier frequencies d1, d2, and d3 mapped to the Subnet identifier "fSubnet1" to acquire a frequency channel for DO protocol communications. Depending on the number of frequencies in the set (here three), and on which frequency is being used by the private access point (for example, the carrier frequency d3), searching the frequencies by the access terminal may still result in a similarly slow acquisition by the access terminal to that seen in the implementation shown in PRL 300 of FIG. 3.

FIG. 5 shows a PRL 500 including a System Table 502 and an Acquisition Table 504. In the PRL 500, as in PRL 400 of FIG. 4, adjacent private access points are assigned separate SID/NID identifiers and separate Subnet identifiers as shown in the ID or Address column 506 of the System Table 502, and are associated with one another using similar association tags "a1" 516, "a2" 518, "a3" 520. In the PRL 500, however, each separate Subnet identifier "fSubnet1," "fSubnet2," "fSubnet3" is assigned a corresponding separate acquisition index "101" 524, "102" 526, and "103" 528. These acquisition indices respectively are directed to and link into the Acquisition Table 504 at respective table rows identified by respective row indices "101" 536, "102" 538, and "103" 540. In this way, the separate Subnet identifiers listed in the ID or Address column 506 of System Table 504 are respectively mapped to respective individual frequencies d1 544, d2 546, and d3 548 included in the respective table rows of the Acquisition Table 504.

Assigning different DO protocol frequencies to different DO identifiers for communication by adjacent private access points such as private access points 202, 212, as shown in FIG. 5, may shorten the acquisition time for an access terminal attempting to initiate communication with a private access point according to the DO protocol frequencies. According to this implementation, this potentially shorter acquisition time occurs because the access terminal 206 need only search a single carrier frequency for DO protocol communication in the Acquisition Table 504 for a particular private access point Subnet, versus the access terminal having to search two, three or possibly more carrier frequencies for a particular private access point Subnet.

A method of operation of the access terminal 206 may be described with reference to the PRL 400 of FIG. 4. The access terminal may receive the PRL 400 from a programmable server 220 associated with the radio access network. The access terminal 206 may initiate communication with a radio access network through the private access point 202. The communication may be initiated according to the 1x air interface standard based on a SID/NID identifier "mSID/fNID1" corresponding to the private access point 202. The access terminal 206 may initiate communication in response to having received an indication that the private access point 202 is nearby the terminal 206. The indication may include a 1x beacon broadcast or unicast signal or may be based on increasing signal strength of a 1x signal from the private access point 202. The access terminal 206 may determine the Subnet identifier "fSubnet1" corresponding to the private access point 202 by using the PRL 400. The PRL 400 may identify a set of private access points and may associate the "fSubnet1" identifier with the "mSID/fNID1" identifier via the association tag "a1" 416. The access terminal 206 may determine, using the PRL 400, a set of one or more carrier frequencies, the set 442 of frequencies d1, d2, and d3, being for communication according to the DO air interface standard. The "fsubnet1" identifier may be mapped in the PRL 400 to the set 442 of frequencies by way of the acquisition index "101" 424 and the row index "101" 434. The access terminal 206 may attempt, based on the PRL 400, to initiate communication with the radio access network through the private access point 202 according to the DO air interface standard based on the "fsubnet1" identifier at one carrier frequency of the set 442 of frequencies d1, d2, and d3.

In an implementation, a second SID/NID identifier "mSID/fNID2" corresponding to a second private access point 212 and different from the first SID/NID identifier "mSID/fNID1" may be associated in the PRL 400, via the association tag "a2" 418, with a second Subnet identifier "fSubnet2" that is different from the first Subnet identifier "fsubnet1" and that corresponds to the private access point 212. The "fSubnet2" identifier may be mapped to the same set of one or more carrier frequencies, the set 442 of frequencies d1, d2, and d3, for DO protocol communication by way of the same acquisition index "101" 424 and the same row index "101" 434.

A similar method of operation of the access terminal 206 may be described with reference to the PRL 500 of FIG. 5, with differences including that the unique Subnet identifiers "fsubnet1" and "fSubnet2" each have respective unique acquisition indices "101" 524 and "102" 526; and that unique Subnet identifiers "fsubnet1" and "fSubnet2" are mapped to respective single carrier frequencies d1 and d2 via the respective acquisition indices 524, 526 and the respective row indices "101" 536 and "102" 538.

In an implementation, the SID/NID and Subnet identifiers of FIGS. 4 and 5 are unique across all private access points, while in another implementation that may require fewer rows in a PRL, these identifiers are unique across some private access points, such as within a particular set of private access points, for example, private access points that are neighboring or adjacent to one another. In some implementations, the single SID/NID identifier may include a unique SID (e.g., not shared with any macro access point) and a (possibly) non-unique NID, such as the addresses fSID1/*, fSID2/*, . . . fIDn/*, where "*" denotes a wildcard NID. In other implementations, the single SID/NID identifier may include a (possibly) non-unique SID and a unique NID (e.g., not shared with any macro access point).

SID/NID and Subnet identifiers and corresponding rows for one or more macro access points such as macro access point 108 are included in the PRLs 400, 500 but are not shown in FIGS. 4 and 5, respectively.

Although two tables 302, 304 are shown in the PRLs of FIGS. 3-5, other arrangements are possible. In other implementations, the PRL is a single table rather than two tables.

Although the techniques described above employ the 1xRTT and EV-DO air interface standards, the techniques may be applicable to other air interface technologies.

The processes described herein are not limited to use with any particular hardware, software, or programming language; they may find applicability in any computing or processing environment and with any type of machine that is capable of running machine-readable instructions. All or part of the processes can be implemented in digital electronic circuitry, or in computer hardware, firmware, software, or in combinations thereof.

All or part of the processes can be implemented as a computer program product, e.g., a computer program tangibly embodied in one or more information carriers, e.g., in one or more machine-readable storage media or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions associated with the processes can be performed by one or more programmable processors executing one or more computer programs to perform the functions of the processes. The actions can also be performed by, and the processes can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, one or more processors will receive instructions and data from a read-only memory or a random access memory or both. The essential elements of a computer are one or more processors for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Actions associated with the processes can be rearranged and/or one or more such action can be omitted to achieve the same, or similar, results to those described herein.

Elements of different implementations may be combined to form implementations not specifically described herein.

In using the term "may," it is understood to mean "could, but not necessarily must."

Numerous uses of and departures from the specific system and processes disclosed herein may be made without departing from the inventive concepts. Consequently, the invention is to be construed as embracing each and every novel feature and novel combination of features disclosed herein and limited only by the spirit and scope of the appended claims.

What is claimed is:

1. A method comprising:
   accessing a roaming list identifying a set of private access points, at least one of the access points in the set of private access points configured to communicate with a radio access network, the roaming list comprising a first table and a second table,
   wherein the first table comprises:
      a first identifier associated with a second identifier, at least one of the first and the second identifiers corresponding to a first private access point from the set of private access points;
      a third identifier associated with a fourth identifier, at least one of the third and the fourth identifiers corresponding to a second private access point from the set of private access points, wherein the first and third identifiers are compatible with a first air interface standard, the second and fourth identifiers are compatible with a second air interface standard, and the first identifier is different from the third identifier;
      a first index corresponding to a first row for the second identifier in the first table, the first index being directed to a first row in the second table, the first row in the second table comprising a first set of one or more carrier frequencies; and
      a second index corresponding to a second row for the fourth identifier in the first table, the second index being directed to a second row in the second table, the second row in the second table comprising a second set of one or more carrier frequencies; and
   selecting, using the roaming list, a private access point from the set of private access points, the selected private access point configured to communicate with the radio access network according to the first air interface standard and the second air interface standard.

2. The method of claim 1, further comprising:
   if the first private access point is selected,
   attempting communication with the first private access point, according to the second air interface standard, using at least one of the carrier frequencies in the first set of one or more carrier frequencies.

3. The method of claim 2, further comprising:
   if the second private access point is selected,
   attempting communication with the second private access point, according to the second air interface standard, using at least one of the carrier frequencies in the second set of one or more carrier frequencies.

4. The method of claim 1, wherein the second identifier is different from the fourth identifier.

5. The method of claim 1, wherein the first set of one or more carrier frequencies comprises a first carrier frequency, and the second set of one or more carrier frequencies comprises a second carrier frequency that is different from the first carrier frequency.

6. The method of claim 1, wherein the first index comprises the second index, the first row in the second table comprises the second row in the second table, and the first set of one or more carrier frequencies comprises the second set of one or more carrier frequencies.

7. The method of claim 6, wherein the first set of one or more carrier frequencies comprises a single carrier frequency.

8. The method of claim 1, further comprising:
   receiving the roaming list from a server associated with the radio access network.

9. The method of claim 8, wherein the roaming list is received via an over-the-air configuration protocol.

10. The method of claim 1, wherein the first table comprises the second table.

11. The method of claim 1, wherein the first and the third identifiers comprise System ID/Network IDs (SID/NIDs), and the second and the fourth identifiers comprise Subnet IDs.

12. The method of claim 1, wherein the first air interface standard is 1xRTT and the second air interface standard is EV-DO.

13. One or more non-transitory machine-readable media configured to store instructions that are executable by one or more processing devices to perform operations comprising:
    accessing a roaming list identifying a set of private access points, at least one of the access points in the set of private access points configured to communicate with a radio access network, the roaming list comprising a first table and a second table,
    wherein the first table comprises:
       a first identifier associated with a second identifier, at least one of the first and the second identifiers corresponding to a first private access point from the set of private access points;
       a third identifier associated with a fourth identifier, at least one of the third and the fourth identifiers corresponding to a second private access point from the set of private access points, wherein the first and third identifiers are compatible with a first air interface standard, the second and fourth identifiers are compatible with a second air interface standard, and the first identifier is different from the third identifier;
       a first index corresponding to a first row for the second identifier in the first table, the first index being directed to a first row in the second table, the first row in the second table comprising a first set of one or more carrier frequencies; and
       a second index corresponding to a second row for the fourth identifier in the first table, the second index being directed to a second row in the second table, the second row in the second table comprising a second set of one or more carrier frequencies; and
    selecting, using the roaming list, a private access point from the set of private access points, the selected private access point configured to communicate with the radio access network according to the first air interface standard and the second air interface standard.

14. The one or more non-transitory machine-readable media of claim 13, wherein the operations further comprise:
    if the first private access point is selected,
    attempting communication with the first private access point, according to the second air interface standard, using at least one of the carrier frequencies in the first set of one or more carrier frequencies.

15. The one or more non-transitory machine-readable media of claim 13, wherein the second identifier is different from the fourth identifier.

16. The one or more non-transitory machine-readable media of claim 13, wherein the first set of one or more carrier frequencies comprises a first carrier frequency, and the second set of one or more carrier frequencies comprises a second carrier frequency that is different from the first carrier frequency.

17. The one or more non-transitory machine-readable media of claim 13, wherein the first index comprises the second index, the first row in the second table comprises the second row in the second table, and the first set of one or more carrier frequencies comprises the second set of one or more carrier frequencies.

18. The one or more non-transitory machine-readable media of claim 13, wherein the operations further comprise:
   receiving the roaming list from a server associated with the radio access network.

19. A system comprising:
   one or more processing devices; and
   one or more non-transitory machine-readable media configured to store instructions that are executable by the one or more processing devices to perform operations comprising:
      accessing a roaming list identifying a set of private access points, at least one of the access points in the set of private access points configured to communicate with a radio access network, the roaming list comprising a first table and a second table,
      wherein the first table comprises:
         a first identifier associated with a second identifier, at least one of the first and the second identifiers corresponding to a first private access point from the set of private access points;
         a third identifier associated with a fourth identifier, at least one of the third and the fourth identifiers corresponding to a second private access point from the set of private access points, wherein the first and third identifiers are compatible with a first air interface standard, the second and fourth identifiers are compatible with a second air interface standard, and the first identifier is different from the third identifier;
         a first index corresponding to a first row for the second identifier in the first table, the first index being directed to a first row in the second table, the first row in the second table comprising a first set of one or more carrier frequencies; and
         a second index corresponding to a second row for the fourth identifier in the first table, the second index being directed to a second row in the second table, the second row in the second table comprising a second set of one or more carrier frequencies; and
      selecting, using the roaming list, a private access point from the set of private access points, the selected private access point configured to communicate with the radio access network according to the first air interface standard and the second air interface standard.

20. The system of claim 19, wherein the operations further comprise:
   if the first private access point is selected,
   attempting communication with the first private access point, according to the second air interface standard, using at least one of the carrier frequencies in the first set of one or more carrier frequencies.

21. The system of claim 19, wherein the second identifier is different from the fourth identifier.

22. The system of claim 19, wherein the first set of one or more carrier frequencies comprises a first carrier frequency, and the second set of one or more carrier frequencies comprises a second carrier frequency that is different from the first carrier frequency.

23. The system of claim 19, wherein the first index comprises the second index, the first row in the second table comprises the second row in the second table, and the first set of one or more carrier frequencies comprises the second set of one or more carrier frequencies.

24. The system of claim 19, wherein the operations further comprise:
   generating the roaming list;
   providing the roaming list to the access terminal;
   generating an updated roaming list identifying an updated set of private access points; and providing the updated roaming list to the access terminal.

25. A method comprising:
   generating a roaming list identifying a set of private access points for an access terminal, at least one of the access points in the set of private access points configured to communicate with a radio access network, the roaming list comprising a first table and a second table;
   associating a first identifier with a second identifier in the first table, at least one of the first and the second identifiers corresponding to a first private access point from the set of private access points;
   associating a third identifier with a fourth identifier in the first table, at least one of the third and the fourth identifiers corresponding to a second private access point from the set of private access points, wherein the first and third identifiers are compatible with a first air interface standard and the second and fourth identifiers are compatible with a second air interface standard;
   providing a first index corresponding to a first row for the second identifier in the first table, the first index being directed to a first row in the second table, wherein the first row in the second table comprises a first set of one or more carrier frequencies for the access terminal to use to attempt communication with the first private access point according to the second air interface standard;
   providing a second index corresponding to a second row for the fourth identifier in the first table, the second index being directed to a second row in the second table, wherein the second row in the second table comprises a second set of one or more carrier frequencies for the access terminal to use to attempt communication with the second private access point according to the second air interface standard; and
   providing the roaming list to the access terminal.

26. The method of claim 25, further comprising:
   generating an updated roaming list identifying an updated set of private access points; and
   providing the updated roaming list to the access terminal.

27. One or more non-transitory machine-readable media configured to store instructions that are executable by one or more processing devices to perform operations comprising:
   generating a roaming list identifying a set of private access points for an access terminal, at least one of the access points in the set of private access points configured to communicate with a radio access network, the roaming list comprising a first table and a second table;
   associating a first identifier with a second identifier in the first table, at least one of the first and the second identifiers corresponding to a first private access point from the set of private access points;
   associating a third identifier with a fourth identifier in the first table, at least one of the third and the fourth identifiers corresponding to a second private access point from the set of private access points, wherein the first and third identifiers are compatible with a first air interface standard and the second and fourth identifiers are compatible with a second air interface standard;

providing a first index corresponding to a first row for the second identifier in the first table, the first index being directed to a first row in the second table, wherein the first row in the second table comprises a first set of one or more carrier frequencies for the access terminal to use to attempt communication with the first private access point according to the second air interface standard;

providing a second index corresponding to a second row for the fourth identifier in the first table, the second index being directed to a second row in the second table, wherein the second row in the second table comprises a second set of one or more carrier frequencies for the access terminal to use to attempt communication with the second private access point according to the second air interface standard; and providing the roaming list to the access terminal.

28. The one or more non-transitory machine-readable media of claim 27, wherein the operations further comprise:
generating an updated roaming list identifying an updated set of private access points; and
providing the updated roaming list to the access terminal.

29. A system comprising:
one or more processing devices; and
one or more non-transitory machine-readable media configured to store instructions that are executable by the one or more processing devices to perform operations comprising:
generating a roaming list identifying a set of private access points for an access terminal, at least one of the access points in the set of private access points configured to communicate with a radio access network, the roaming list comprising a first table and a second table;

associating a first identifier with a second identifier in the first table, at least one of the first and the second identifiers corresponding to a first private access point from the set of private access points;

associating a third identifier with a fourth identifier in the first table, at least one of the third and the fourth identifiers corresponding to a second private access point from the set of private access points, wherein the first and third identifiers are compatible with a first air interface standard and the second and fourth identifiers are compatible with a second air interface standard;

providing a first index corresponding to a first row for the second identifier in the first table, the first index being directed to a first row in the second table, wherein the first row in the second table comprises a first set of one or more carrier frequencies for the access terminal to use to attempt communication with the first private access point according to the second air interface standard;

providing a second index corresponding to a second row for the fourth identifier in the first table, the second index being directed to a second row in the second table, wherein the second row in the second table comprises a second set of one or more carrier frequencies for the access terminal to use to attempt communication with the second private access point according to the second air interface standard; and providing the roaming list to the access terminal.

30. The system of claim 29, wherein the operations further comprise:
generating an updated roaming list identifying an updated set of private access points; and
providing the updated roaming list to the access terminal.

* * * * *